United States Patent
Schnackenberg et al.

[11] 3,871,240
[45] Mar. 18, 1975

[54] POWER TRANSMISSION BELTS

[75] Inventors: Werner D. Schnackenberg, Englewood; James M. Lane, III, Aurora, both of Colo.

[73] Assignee: The Gates Rubber Company, Denver, Colo.

[22] Filed: Mar. 11, 1971

[21] Appl. No.: 123,275

[52] U.S. Cl. .................. 74/234, 156/140, 161/190
[51] Int. Cl. ...... F16g 5/00, B29h 7/22, B36b 27/40
[58] Field of Search ...... 74/231 R, 231 P, 233, 234; 156/140; 161/190

[56] References Cited
UNITED STATES PATENTS

| | | | |
|---|---|---|---|
| 2,167,384 | 7/1939 | Freedlander | 74/233 X |
| 2,538,414 | 1/1951 | Crosby | 74/233 X |
| 2,805,182 | 9/1957 | Hallenbeck | 74/231 P UX |
| 2,983,304 | 5/1961 | Rasero | 161/190 X |
| 3,371,548 | 3/1968 | Marzocchi | 74/234 |
| 3,416,383 | 12/1968 | Jettson et al. | 74/233 |
| 3,545,293 | 12/1970 | Marzocchi et al. | 74/231 R |
| 3,656,360 | 4/1972 | Fix | 74/234 |
| 3,657,938 | 4/1972 | Fisher | 74/233 |

Primary Examiner—Leonard H. Gerin
Attorney, Agent, or Firm—Raymond Fink; H. W. Oberg, Jr.; Curtis H. Castleman, Jr.

[57] ABSTRACT

This invention relates to the incorporation of fibers or fabric having a high melt characteristic placed in the body portion of power transmission belts. The fibers protrude beyond the surface of the polymer portion of the belt to contact the surface of the sheave in a manner to improve stability and increase load-life characteristics by imparting transverse support and rigidity to the tensile members. The fiber protrusions modify and stabilize the frictional characteristics of the belt on the sheave. Further, the incorporation of the fibers in the body of the belt tend to minimize noise generation.

28 Claims, 3 Drawing Figures

PATENTED MAR 18 1975 3,871,240

INVENTORS:
WERNER D. SCHNACKENBERG
JAMES M. LANE III
BY Raymond Fink

POWER TRANSMISSION BELTS

BACKGROUND OF THE INVENTION

A number of patents have described construction methods and the resulting products therefrom for various types of power transmission belts including synthetic rubbers of various types and polyurethane rubber in particular. Early patents, especially for polyurethane, were directed to construction of timing belts or positive drive belts.

Some other patents such as U.S. Letters Pat. No. 3,138,962 to Hains, et al., and U.S. Pat. No. 3,200,180 to Russ, et al., having been granted which describe methods and products for manufacturing power transmission belts from polyurethane rubber.

This invention concerns itself with the incorporation of textile cords, fabric or fibers in the body section of power transmission belts with the fibers of such a nature that throughout the useful life of the belt, the ends of the fiber will protrude beyond the surface of the polymer portion of the belt. Some patents such as U.S. Pat. No. 3,122,934 to Fihe and others, which may be found in class 74, sub class 232 and others, disclose the use of fabric or cross cords in the body sections of power transmission belts. To the knowledge of the applicants, however, no belts have been described incorporating fibers in a manner to protrude beyond the polymer side portion of the belt. There are especially no disclosures utilizing such fibers in the concentrations as expressed herein according to the invention and for the purposes specified.

The invention is more particularly beneficial to those power transmission belts made of a material such as polyurethane having very high coefficient of friction. While this characteristic is generally a desirable one, it does produce some adverse or detrimental results such that after the surfaces of the sheave and the power transmission belt have become polished, the belt tends to stick in the sheave instead of exiting from the sheave easily. Conversely the belt tends to hang up, especially on the bottom corners and experiences difficulty in entering the sheave. This sticking may produce two detrimental results; one is that the belt tends to become more unstable since the belt tends to stick on either of the two sheave walls. This decreased stability may have an adverse affect such as inducing the belt to turnover.

Another adverse affect may be a noise generation due to the stick and slip of the belt in the sheave. Such belts which have this noise generation are generally undesirable especially in the more aesthetic applications such as passenger cars where the greatest degree of quiet is desired. Use of fibers protruding from the sidewall of the belt, particularly at the bottom corners has essentially eliminated the slip-stick occurrence and the resulting noise and instability.

The third effect on the cords and fabric incorporated in the body section of the belt is the increased transverse stability and support given to the power transmission belt. In those belts, which are generally referred to as raw edge belts, including rubber and polyurethane, the edge cord or tensile member is both weakened and exposed. The dynamic interplay between the power transmission belt and the sheave tends to destroy the support of such an edge cord. The utilization of the fiber and fabric in the body portion of the belt, however, increased the support of the edge cord and delays failure of the edge cord.

It is an object of this invention, therefore, to modify the construction of raw edge power transmission belts to increase the stability and decrease the susceptibility of noise and to lend greater support to the edge cord.

It is a further object of this invention to modify the body portion construction of the belt in a manner which will increase the load life capability of the belt.

These and other objects and advantages will become more apparent in the following detailed description when considered in view of the accompanying drawings illustrating preferred embodiments of the present invention in which.

SUMMARY OF THE INVENTION

Figure 1:
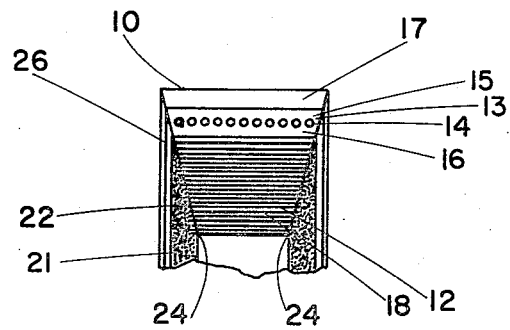
FIG. 1 is an isometric view of a V shaped power transmission belt.
Figure 2:
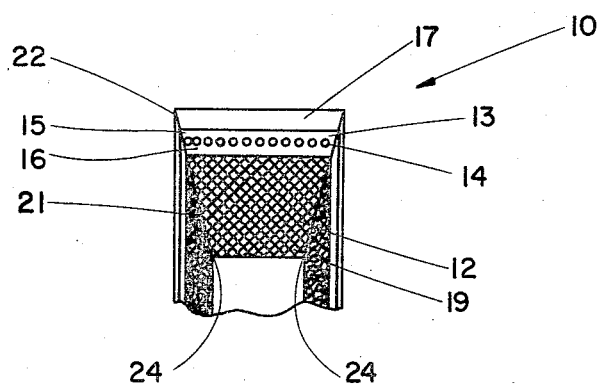
FIG. 2 is a cross section of a power transmission belt.
Figure 3:
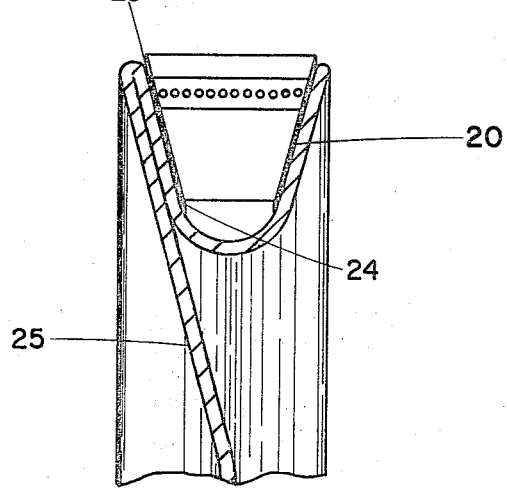
FIG. 3 is a cross section of a power transmission belt in a sheave.

Cord of fabric having high melt characteristics and high heat stability are incorporated in the body section of power transmission belts in concentrations in the range of from 5 to 50 percent. The cord or fabric protrudes beyond the polymer section of the belt and preferably incorporates that type of cord having a multitude of discrete little fibers extending from the beam part or main cord section of the belt. The cords generally are oriented in the transverse direction relative to the direction of travel of the belt in order to increase the transverse rigidity and support of the belt and yet maintain a high degree of flexibility of the belt as it rotates.

This modification is particularly adaptable to raw edge belts or belts having no fabric cover and more particularly is adaptable to belts having an inherently high coefficient of friction such as polyurethane belts. The protrusion or exposure of the fabric portion of the belt beyond the polymer section provides a belt having frictional characteristics such that the belt is less sensitive to temperature and pressure and will impart characteristics which are more resistant to detrimental effects of slipping.

TECHNICAL DISCLOSURE

Typically power transmission belts may be of a variety of shapes. Generally, however, the belts 10 are V shaped in cross section. Consequently the most usual type of power transmission belt is commonly referred to as a V-belt. Many types of motion and traction belts, however, are generally substantially rectangular in cross section. Other types of belts have been referred to such as timing belts or positive drive belts. All of these belts especially those having a raw edge or no cover or band around the external portion of the belt are adaptable to be used with the improvement described herein. For illustration purposes, a V belt will be shown herein, though the invention is adaptable to transmission belts in general.

Typically there are three significant portions to a power transmission belt 10. A compression section 12 forms the under body portion of the belt and generally may comprise a high modulus stock. The compression section 12 is compounded in such a manner to give the greatest degree of support to the neutral axis 13 which is directly above the compression section 12. The neutral axis 13 generally in power transmission belts comprise a tensile member 14. Tensile members 14 comprise a plurality of longitudinally spaced apart cords imbedded in or between an overcord cushion 15 and an undercord cushion 16. The tensile members 14 are high strength cords which generally carry the full tractive and transmission portion of the function of the belt. Immediately on top of the neutral axis 13 and forming the top portion of the belt is a tension section 17.

It should be realized that throughout this invention whenever the term rubber is used it may refer to a variety of types of rubbers. In this particular invention the improvement seems to be particularly adaptable toward a polyurethane rubber. However, the invention is equally applicable to natural or synthetic rubber or rubber like compounds which are normally used in transmission belt art. Synthetic rubber material may comprise butadiene/styrene, butadiene/acrylonitrile copolymers, or polychloroprene copolymers in addition to polyurethane.

The cords 18 or fabrics 19 utilized in this invention are conveniently placed in the compression section 12 of the power transmission belt. Generally the cords 18 or fabric 19 are placed in a manner which are substantially transverse to the direction of travel of the belt. However, it has been found that angles as low as 45° relative to the transverse direction of the belt may be utilized. If one goes generally lower than 45° relative to the direction of travel of the belt, the fabrics 19 or cords 18 extending in this direction impart bending forces which adversely effect the flexibility of the belt. It is obvious that an attempt is made to increase the transverse support and yet minimize the bending moments which are in the direction of travel of the belt. As was stated, the reason for this is that one wishes to maintain the highest degree of flexibility of belt in the direction of travel of the belt. Thus, generally speaking the cords 18 or fabric 19 is placed in a manner of between 45° and 90° to the direction of travel of the belt.

The cord or fabric is chosen from that type of material having a high temperature stability or high melt characteristics. It is known that belt temperature may reach a surface temperature as high as 380° Fahrenheit when the belt incurs slipping in the sheave. For this reason it is necessary that the cord or fabric have a relatively high heat stability and resistance to melt. Accordingly, those cords and fabric which are preferred in this invention are cotton, rayon, jute, and fiberglass. Such cords either melt at a high temperature or will decompose. Fiberglass has an adverse characteristic in that it is an extremely abrasive material and has a greater adverse effect on the sheave surface 20 than cotton, rayon or jute.

The particular characteristic of these cords or fabric which has been mentioned is the high resistance to melt. Accordingly, when the belts are shaped, the belts are cut in such a manner that the cords protrude beyond the side surface of the polymer portion of the belt. Thus if the belts are cut with milling cutters or multiple cutters or wobbled cutters, the protrusion will result in an easier fashion. Clean sharp cutting will minimize the protrusion. These materials have a relatively high abrasion resistance and surprisingly enough will withstand wear to a greater degree then the polymer portion 21 of the belt. Accordingly even as the belt is worn, due to the interaction between the side of the belt and sheave, the fiber or cord 22 will continue to protrude beyond the polymer portion 21 of the belt. Thus the surface characteristics or interface 23 formed by the fiber will remain throughout the useful portion of wear of the belt.

In order to impart a maximum degree of support, the fiber or fabric or cord is loaded preferably to a concentration of about 20 percent of the total volume of the body portion of the belt in which the fabric is placed. One may reduce the concentration to as low as 5 percent, however, such a low amount has a minimal effect of the desired characteristics. If one, on the other hand, exceeds a loading of about 50 percent by volume, the belt becomes stiff and adversely affects the flexibility of the belt.

So long as the protruding cord 18 or fabric 19 are placed at least in the lower portion of the compression section 12 of the belt 10 such that the fabric protrudes at least in the general region of the lower corners 24, lower concentrations of loading in the range of 5 percent, will be beneficial. The significance of placement in the lower corners will be explained later. Generally speaking, however, the more optimum concentration of fabric placement is about 20 percent or more by volume.

It was previously stated that the modification and improvement is most generally adaptable to belts of polyurethane. Polyurethane, it was explained, has an extremely high coefficient of friction to the extent that the belt may stick to the surface of the sheave 25 especially after both the sheave surface and the belt surface have been worn to the degree where there is a high polish on each surface. Under those conditions, the cohesive forces between the belt and the sheave are such that the belt has difficulty either in entering or leaving the sheave. The high cohesive force and the high friction tends to adversely effect the stability of the belts as the belt is entering. With such high forces the belt may tend to stick on the corner 24 and overturn. Conversely the belt 10 may stick in the sheave as it is about to exit from sheave 25. If this occurs, the belt may catch and tend to turn either on one corner of the other.

It is this sticking and slipping nature of the belt that may also create a noise generation at times.. In other words if the belt momentarily sticks in the sheave and then slips, there is a crackling or popping noise which may be generated. Cords therefore, are loaded into the belt in order to protrude beyond the surface of the belt. This changes the interface characteristics and tends to create a surface having a more consistent frictional characteristic such that the belt has a sufficiently high degree of friction to provide maximum transmission forces but on the other hand will allow the belt and the sheave to interact freely relative to one another. The modified surface 23 therefore, will minimize sticking tendencies and also enhance the stability of the belt and will minimize if not eliminate noise.

As was previously stated, the textile portions seem to have a greater wear resistance than do the polymer portions even when the polymer comprises the very abrasion resistant polyurethane. Thus the modified surface condition is maintained throughout the useful life period of the belt. The cord of fabric will continue to protrude beyond the surface of the polymer portion of the belt so long as the cord material has a suitable melt characteristic. It is for this reason that the preferred types of loading would be jute, cotton, rayon or fiberglass.

In order to provide the maximum modified surface characteristics it is also preferred to choose that kind of cord which has a multitude of individual fibers which extend beyond the lateral edge portion of the cord or fabric. Thus cotton especially has a multitude of short staple fibers which extend in a direction beyond the cord part in addition to having a tendency to fuzz or frill at the lateral portion of the fabric. Individual short discrete fibers are generally, however, not the most preferred made of this invention since the fibers seem to need a support or beam upon which it can maintain a lateral reactive force component to provide the necessary wedging in the sheave. Thus while it is possible to use discrete fibers which may be oriented generally in a lateral direction these generally are not quite as acceptable as fabric or cords which are anchored within the body portion of the belt. Additionally, however, it is found that when discrete fibers are used, the total overall loading does not reach that degree which gives the most preferred results. As was previously stated it is found that the optimum loading is about 20 percent of fiber in the polymer. Discrete individual fibers, no matter how highly loaded, generally cannot reach this concentration. Additionally the flexibility is adversely effected. Also the fibers do not tend to have that support necessary to continue the protrusion or extension beyond the surface of the belt.

Another characteristic that is favorably effected is the support which is imparted to the edge cord 26 of the tensile member on a raw edge belt. It is the edge cord which undergoes the greatest amount of dynamic stress fatique. The edge cords are exposed and they tend to take the greatest amount of stresses and forces imparted by the sheave as well as a disproportionally high portion of the tensile load. As this is imparted to the edge cord, the edge cord tends to degrade and work away from the belt itself. Incorporation of the fabric or cords either in the compression section 12 or the tension 17 lend a great degree of support to the tensile members especially the edge cords and tend to hold the edge cord integrally within the belt. The belt, therefore, is capable of operating under a much increased loadlife capacity. The following tables show the type of improved load-life characteristics found with the utilization of the present invention.

TABLE I

60° Polyurethane Belts 55" Length
(20% by volume cotton cord loading)

| Belt Size | Test Conditions | Belt Description | Average Belt Life (Hours) |
|---|---|---|---|
| 7M | 3-point Water Brake 1.688" dia. generator sheave 4900 RPM DriveR 13.4 H.P. Load | No cord | 320 |
| 7M | 3-point Water Brake 1.688" dia. generator sheave 4900 RPM DriveR 13.4 H.P. Load | 40 ga.-cord | 778 |
| 7M | 3-point Water Brake 1.688" dia. generator sheave 4900 RPM DriveR 13.4 H.P. Load | 40 ga.-cord-notched | 776 |
| 7M | Dead weight 120 lb. load 1.375" dia. sheave 10,500 RPM | No cord | 300 |
| 7M | Dead weight 120 lb. load 1.375" dia. sheave 10,500 RPM. | 40 ga.-cord | 1,560 |
| 7M | Dead weight 120 lb. load 1.375" dia. sheave 10,500 RPM | 40 ga.-cord-notched | 2,225 |
| 7M | Dead weight 120 lb. load 1.375" dia. sheave 10,500 RPM | 30 ga.-cord | 1,857 |
| 7M | Dead weight 120 lb. load 1.375" dia. sheave 10,500 RPM | 30 ga.-cord-notched | 2,530 |
| 11M | 3-point Water Brake 1.875" dia. generator sheave 4900 RPM 14.5 H.P. Load | No cord | 280 |
| 11M | 3-point Water Brake 1.875" dia. generator sheave 4900 RPM 14.5 H.P. Load | 50 ga.-cord | 295 |
| 11M | 3-point Water Brake 1.875" dia. generator sheave 4900 RPM 14.5 H.P. Load | 50 ga.-cord-notched | 516 |
| 11M | 3-point Water Brake 1.875" dia. generator sheave 4900 RPM 14.5 H.P. Load | 40 ga.-cord | 863 |
| 11M | 3-point Water Brake 1.875" dia. generator sheave 4900 RPM 14.5 H.P. Load | 40 ga.-cord-notched | 1,155 |
| 11M | Dynamometer 4.34" dia. sheave 1750 RPM 13.5 H.P. Load | No cord | 32 |
| 11M | Dynamometer 4.34" dia. sheave 1750 RPM 13.5 H.P. Load | 50 ga.-cord | 71 |
| 11M | Dynamometer 4.34" dia. sheave 1750 RPM 13.5 H.P. Load | 40 ga.-cord | 92 |

TABLE 2

36° Polyurethane Belt-55" Length
20% by volume loading

| Belt Size | Test Conditions | Belt Description | Average Belt Life (Hours) |
|---|---|---|---|
| 3V | 9.0 H.P. Dynamometer 3.35" dia. sheave 1750 RPM | No cord | 37 |
| 3V | 9.0 H.P. Dynamometer 3.35" dia. sheave 1750 RPM | 50 ga.- cotton | 280 |
| 3V | 9.0 H.P. Dynamometer 3.35" dia. sheave 1750 RPM | 50 ga.- cotton leno | 410 |
| 3V | 9.0 H.P. Dynamometer 3.35" dia. sheave 1750 RPM | 40 ga.- cotton leno | 385 |
| 3V | 9.0 H.P. Dynamometer 3.35" dia. sheave 1750 RPM | 40 ga.- jute | 588 |

It should be noted that common belt technology nomenclature is used in the tables. All of the belts tested are nominal 55 inches in length. 7M belts have a nominal 7.0 millimeter top width, 11M belts have a nominal top width of 11.0 millimeters. Likewise belts denoted as 3V belts are those commonly used in the industry and are of a high capacity power transmission belt having a ⅜ inch nominal top width with a ¼ nominal depth. The belts as described therein are also 55 inches of nominal length.

It will be noted from the tables above that belts having a cross section of nominal 60° and 36° included angle are both described. The reason for this is that belts made of all polyurethane were previously primarily of a 60° cross-sectional angle. However, with the improvements described herein conventional belt angles are also satisfactory such as 36°.

It will also be noted that data is given for notched belts. Notching is a common practice utilized in the power transmission industry wherein small notches are cut in the undercord of the belt extending in a transverse direction. Such notching is continued around the entire inner circumference of the belt. Generally, may is utilized in those applications where high stress degradation maya result. This is particularly true with small diameter sheaves where the stress flexing is particularly great. It will be noted from the tables that the notching in general does impart an improvement over the unnotched belts, however, it should be noted that even though notching itself does give an increased load life capacity belts without notching which utilize this invention also show a great improvement.

As shown by the tables various cord dimensions may be utilized in this invention. Thus cotton cord may range from 30 to 50 gage and still encompass the same degree of improvement. The cord may appear as a diagonal of fabric or may be a cross cord which is placed conveniently in an angle approaching 90 relative to the direction of travel of the belt. It should be noted that fabric is satisfactory. The jute material which has been used is conveniently used in the form of burlap material of various gages.

Another interesting variation of this invention is to utilize cotton leno which has very small and intermittent strands tieing the predominantly larger cords together. The advantage to this is that one is able to approach the 90° cross cord angle of the heavier cotton cord but the cord is tied together by small pick cords which hold the main cords together. Another interesting utilization of the current invention is the use of felt dispersed within the layers of the fabric used herein. The use of short discrete felt fibers either in an oriented or unoriented manner are beneficial in providing additional lateral stability for support of the tensile members. Another convenient method of placing cords in the body is by mounting cords on a scrim fabric such as cotton cheesecloth. The scrim holds the cord in a convenient manner enabling the cords to be handled and placed easily.

It should be obvious that the main factors improving the load-life capacity of the belt are enhanced stability minimizing chances of belt turnover and improved edge cord protection and integration of the edge tensile member. Another advantage is the elimination of noise which may be generated by the stick-slip of the belt.

If the belts are cut and the cord and fabric oriented in the belt to provide a protrusion of the fiber beyond the polymer wall of the belt of around 0.010 of a inch, good results are obtained. However, protrusions of as little as 0.001 to 0.002 inch and as much as 0.020 inch work well. A range of 0.005 to 0.010 seems to be optimum. Such protrusion will last during the useful life of the belt.

One final comment is rather apropos especially as this invention relates to polyurethane belts. These belts have a somewhat lower melt characteristic then other types of polymers such as neoprene, natural rubber of SBR. The interface created by the fiber allows a much higher degree of slip to occur before the belt utilizing this invention in a polyurethane construction will undergo adverse deformation or melting tendencies. In other words, the fibers sticking out beyond the belt tend to protect the belt in that the frictional heat is dissipated and less heat is transmitted to the polymer. Thus a polyurethane belt having no fiber loading of the nature described herein tolerates poorly slipping greater than 10 percent for more than a few seconds. The polyurethane belt employing this improvement will satisfactorily withstand greater than a 10 percent for more than several minutes without showing adverse melt characteristics. This comment also stresses why it is important that the particular type of loading employed in this invention should preferably be of a high melt resistant characteristic such as found with cotton, rayon, fiberglass, and jute.

It does not seem to be particularly important as to the particular gage of cord used in this invention so long as the cord has the characteristics that were stressed. Accordingly, 30 to 50 gage cotton has been found to be satisfactory. About 40 gage rayon has been found to be equally satisfactory and jute having from 20 to 60 gage works well.

Jute in the form of burlap fabric may be used in a very satisfactory manner throughout this invention. It has been explained previously that generally the cord or fabric is oriented essentially to 45° or greater relative to the direction of travel of the belt in order to maintain the flexibility of the belt itself. One can appreciate, however, that with an E section belt having the nominal top width of 1.50 inch, the flexibility is not so critical especially since they tend to rotate around a sheave having a rather large diameter. Thus jute burlap will be oriented in two directions at approximately 45° relative to the direction of travel of the belt. The flexibility of this belt is still satisfactory and the characteristics of the jute will tend to retain the extension of the jute fibers beyond the sidewall of the belt itself.

What is claimed is:

1. A unitary molded power transmission belt comprising:
a polymer body having a compression section, a neutral axis and a tension section;
discrete protrusions of fiber extending beyond the lateral edge surface of the body portion of said belt, and said fiber protrusions being substantially free from inclusion of body polymer.

2. A belt according to claim 1 in which the fiber protrusions are in the range of from 0.001 to 0.02 inch.

3. A belt according to claim 2 in which the protrusions more preferably extend from 0.005 to 0.02 inch beyond the body of the belt.

4. A belt according to claim 3 in which the preferred protrusion is substantially 0.01 inch beyond the side of the body of the belt.

5. A belt according to claim 1 in which the protrusions extend beyond the lateral edges of the body portion of the belt at least from the lower corners of the compression section.

6. A unitary molded power transmission belt comprising:
a polymer body having a compression section, a neutral axis and a tension section;
melt resistant fiber loading molded within the body portion of said belt; said fiber loading integrally combined in the polymer and resistant to melting.
discrete protrusions of end portions of the fiber beyond the edge surface of the body section of said belt, said protrusions being substantially free of body polymer.

7. A belt according to claim 6 in which the fiber loading is in a range of from 5 to 50 percent by volume of fiber to the polymer.

8. A belt according to claim 7 in which the loading is in a more preferred range of from 10 to 35 percent by volume of fiber to polymer.

9. A belt according to claim 8 in which the most preferred loading is substantially 20 percent by volume of fiber to polymer.

10. A belt according to claim 6 in which the protrusions extend beyond the lateral edges of the body portion of the belt at least from the lower corners of the compression section.

11. A belt according to claim 6 in which the fibers are melt resistant.

12. A belt according to claim 9 in which the fiber end portions extend beyond the entire edge surface of the compression section of the body.

13. A belt according to claim 12 in which the protrusions extend beyond the lateral edges of the body portion of the belt at least from the lower corners of the compression section.

14. A belt according to claim 11 in which the cord is a plurality of layers having a scrim backing.

15. A belt according to claim 6 in which the fiber loading is fabric.

16. A belt according to claim 15 in which the fabric is one having a fibrous material with a melting temperature of greater than 300° Fahrenheit.

17. A belt according to claim 14 in which the fabric is a member of a group consisting of cotton, rayon, jute and fiberglass.

18. A belt according to claim 11 in which the cords consist of fiber having a melt temperature of greater than 300° Fahrenheit.

19. A belt according to claim 11 in which the fibers resist melting or softening from heat below 380° Fahrenheit.

20. A belt according to claim 19 in which the cords are oriented in the belt substantially from 45° to 90° relative to the direction of travel of the belt.

21. A belt according to claim 11 in which the cord is one from a group consisting of cotton, rayon, jute and fiber-glass.

22. A belt according to claim 11 in which the cord is cotton leno oriented with the leno placed in the body substantially 45° to 90° relative to the direction of travel of the belt.

23. A belt according to claim 6 in which the protrusions extend an amount beyond the body portion of the belt sufficient to substantially eliminate polymer contact of the belt with the sheave.

24. A belt according to claim 6 in which the protrusion of fibers is of an amount sufficient to stabilize the frictional characteristics of the belt with the groove walls of the sheave.

25. A belt according to claim 6 in which the body comprises in part a polymer of polyurethane rubber and a loading of fibrous material.

26. A belt according to claim 25 in which the protrusions extend beyond the lateral edges of the body portion of the belt at least from the lower corners of the compression section.

27. A unitary molded power transmission belt comprising:

a body section composed of a polyurethane polymer portion;
fibrous loading material selected from the group consisting of cotton, rayon, jute and fiber-glass,
said fibrous loading present in the body section in the mount of from 5 to 50 percent by volume of fibrous material to polymer portion;
discrete protrusions formed by the fibrous loading material projecting beyond the polymer body surface,
said protrusions extending to from 0.001 to 0.02 inch beyond the edge of said body and being substantially free of body polymer;
a plurality of load carrying tensile members in said body portion oriented substantially to the direction of travel of said belt.

28. A belt according to claim 27 in which the protrusions extend beyond the lateral edges of the body portion of the belt at least from the lower corners of the compression section.

* * * * *